United States Patent [19]

Hart et al.

[11] 4,073,375

[45] Feb. 14, 1978

[54] METHOD OF AND APPARATUS FOR FEEDING RANDOMLY RECEIVED ITEMS

[75] Inventors: Charles G. Hart, Sheboygan; John S. Gordon, Kohler; Richard D. Sorenson, Sheboygan, all of Wis.

[73] Assignee: Hayssen Manufacturing Company, Sheboygan, Wis.

[21] Appl. No.: 767,041

[22] Filed: Feb. 9, 1977

[51] Int. Cl.² .......................................... B65G 47/52
[52] U.S. Cl. ................... 198/466; 198/572; 198/577
[58] Field of Search ............... 198/444, 460, 461, 466, 198/469, 470, 572, 575, 576, 577

[56] References Cited

U.S. PATENT DOCUMENTS

| | | | |
|---|---|---|---|
| 1,954,278 | 4/1934 | Adams | 198/466 |
| 2,917,157 | 12/1959 | Fitzgerald | 198/461 |
| 3,075,630 | 1/1963 | Fisk | 198/572 |
| 3,223,225 | 12/1965 | Clark et al. | 198/357 |
| 3,315,782 | 4/1967 | Eldred | 198/444 |
| 3,452,856 | 7/1969 | Brittain | 198/466 |
| 3,459,289 | 8/1969 | Roseman | 198/466 |
| 3,747,781 | 7/1973 | Daigle et al. | 198/357 |
| 3,751,873 | 8/1973 | Toby | 198/460 |
| 3,794,154 | 2/1974 | Holt | 198/461 |
| 4,029,194 | 6/1977 | Feurstein et al. | 198/358 |

*Primary Examiner*—Robert W. Saifer
*Assistant Examiner*—Richard K. Thomson
*Attorney, Agent, or Firm*—Koenig, Senniger, Powers and Leavitt

[57] ABSTRACT

A method of and apparatus for feeding randomly received items and for placing these items on apparatus, such as a flight conveyor or a packaging machine, which cycles continuously at a steady rate, with the flight conveyor being operated at a cycling rate slightly faster than the average rate at which the items are randomly received, with the placement of an item on the flight conveyor being in timed relation to a portion or window of each cycle of the flight conveyor, and with placement of an item on the flight conveyor being intermittently deferred so as to bring the rate at which the items are randomly received and the operating rate of the flight conveyor into phase with one another.

13 Claims, 4 Drawing Figures

METHOD OF AND APPARATUS FOR FEEDING RANDOMLY RECEIVED ITEMS

BACKGROUND OF THE INVENTION

This invention relates to method of and apparatus for feeding randomly received items and for placing these items, one at a time, on apparatus, such as a flight conveyor or packaging machine, which cycles continuously at a steady rate.

In certain packaging or other operations, the items to be packaged are delivered to the packaging apparatus at an average rate, for example, 60 items per minute, with slight spacing irregularities between successive items. Because these items are randomly received, (i.e., they are not exactly equally spaced from one another) and because the rate at which they are delivered is not necessarily a fixed ratio relative to the speed at which the packaging apparatus is operated (i.e., the item delivery system and the packaging apparatus may not share a common drive), the spacing variations between the items and/or the differences between the delivery rate of the items and cycling rate of the apparatus causes these rates to be periodically in and out of phase with one another. This difference in phase would result in jamming of the packaging apparatus. Thus, there is a need to pace the feeding and placement of the items to be packaged on the continuously operating apparatus so as to avoid jamming or other malfunctions.

In prior feeding or pacing systems, it was conventional for either the feed or pacing system or the packaging apparatus to be operated at a speed significantly faster than the rate at which items were delivered so that each item could be stopped at a holding station, and then fed forward onto the packaging apparatus in timed relation to the packaging apparatus. This, however, required that either the pacing system or the packaging apparatus be continuously operated at a speed significantly faster than the rate at which the items were received and that the pacing system or the packaging apparatus be operated through several cycles without wrapping a package. Thus, the pacing system or the packaging apparatus was necessarily subjected to higher accelerations and loads due to the increased speed at which it operated and the wear and tear on the packaging machine was disproportionate to the number of items packaged.

In packaging certain items, such as stacks of loose paper sheets (reams of paper) received from a sheeter or the like, other problems are encountered in handling the stacks of loose sheets of paper prior to their being wrapped. For example, the loose sheets are easily damaged and the sheets tend to shift when the stacks are accelerated or decelerated.

SUMMARY OF THE INVENTION

Among the several objects of this invention may be noted the provision of the method of and apparatus for feeding or pacing items to be packaged to a continuously operable packaging means (e.g., a flight conveyor or packaging machine) which cycles at a steady rate and for placing the items on the packaging means with the packaging means being operated at a speed only slightly greater than the average rate at which the items to be packaged are randomly received; the provision of such apparatus which can accommodate variances in spacing between successive items to be packaged; the provision of such apparatus which need not be engaged and disengaged for feeding or pacing each item to be conveyed; the provision of such apparatus which can convey items, such as stacks or reams of loose paper sheets, without damage to the items; and provision of such apparatus which is of relatively simple construction, which is reliable in operation, and which has a long service life.

Briefly, the method of this invention relates to feeding items one after another to an apparatus which cycles continuously at a steady rate, referred to as the first rate, with an item being receivable by the apparatus only during a portion of each cycle. The items to be fed to the apparatus are randomly delivered one at a time at an average rate, referred to as the second rate. The method comprises feeding the randomly received items one at a time to a holding station where an item may dwell for an interval. Each item which has been delivered to the holding station is fed forward in time for delivery to the apparatus during the portion of a cycle thereof in timed relation to the apparatus. The feeding of a randomly received item to the holding station occurs at a relatively slow speed while the next leading item (i.e., the previous) is at the holding station and at an accelerated rate when the next item is fed forward to the apparatus. The feeding forward of an item which has been delivered to the holding station too late for delivery to the apparatus during the portion of a cycle thereof is deferred until a next successive cycle of the apparatus.

Conveying apparatus of this invention relates to apparatus for feeding items one after the other to means which cycles continuously at a steady rate, referred to as a first rate, with an item being receivable by the means only during a portion of each cycle thereof. The items to be fed to the means are randomly delivered to the conveying apparatus one at a time at an average rate, referred to as a second rate, the second rate being somewhat slower than the first rate. The apparatus comprises a first conveyor adapted to receive the items one after the other at the second rate. The first conveyor delivers the items one at a time to a holding station. The first conveyor has a slow speed and a fast speed. Means is provided for selectively changing the first conveyor between its fast and slow speeds. Other means responsive to an item being conveyed from the holding station actuates the first conveyor speed change means thereby to accelerate the delivery of the next item to the holding station, and upon delivery of the next item to the holding station, actuates the speed change means thereby to slow down the first conveyor. A second conveyor is provided for conveying each item delivered to the holding station in time for delivery to the means during the portion of the cycle of the means in timed relation to operation of the means. Still other means is provided for sensing the portion of a cycle of the means and for initiating operation of the second conveyor so as to convey an item at the holding station and to place it on the means within the portion of the cycle of the means and for deferring operation of the second conveyor until a successive cycle of the means when the next item is not in the holding station prior to the second conveyor completing placement of the preceding item on the means. Other objects and features of this invention will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
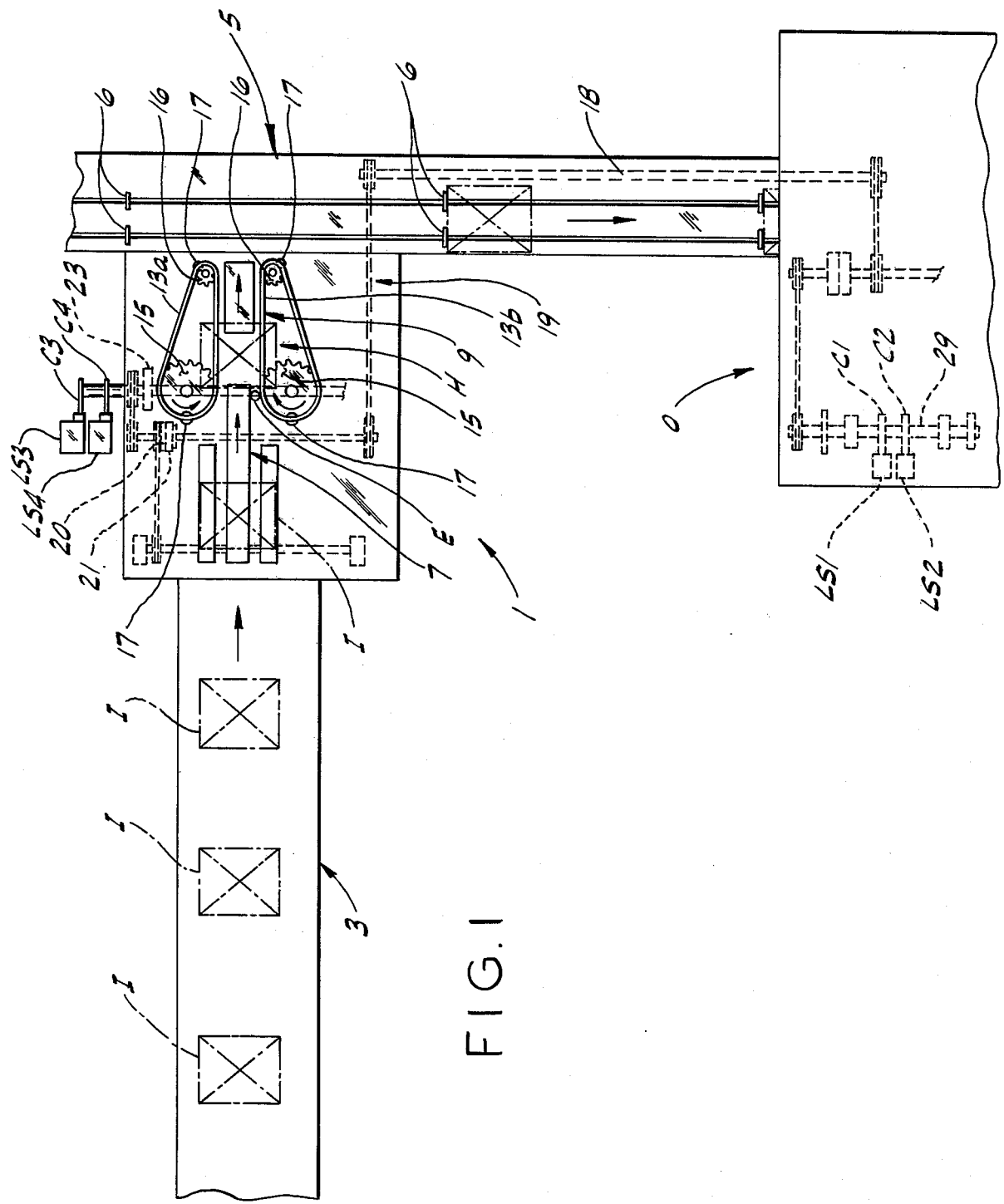
FIG. 1 is a semi-diagramatic plan view of apparatus of this invention for randomly receiving items, such as reams of loose paper sheets, and for feeding these items forward, one at a time, onto a continuously operable flight conveyor for being fed into a packaging machine or the like illustrating various conveyors, mechanical components, and control devices.

Referring now to the drawings, apparatus of this invention, as is generally indicated at 1 is shown for conveying items I, such as stacks or reams of unwrapped paper sheets or the like. This apparatus receives items I from a continuously operable infeed belt conveyor 3 on which they are randomly spaced (preferably they are spaced at substantially regular intervals, but these intervals may vary somewhat from item to item) and paces these items for placement on a flight conveyor 5 which cycles continuously at a steady rate, referred to as a first rate $r_1$. Flight conveyor 5 has a pair of spaced endless chains (not shown) defining an upper and a lower reach. Pairs of flights 6 are secured to these chains at equal intervals therealong, these intervals being substantially longer than the width of the item to be packaged. For example, items I may be stacks of paper sheets measuring $8\frac{1}{2} \times 11$ inches and the intervals between successive flights 6 may be about 26 inches. Flight conveyor 5 is driven at a steady rate and thus flights 6 move past a reference point at a steady rate (the first rate $r_1$) with the time between the passage of successive flights being referred to as a cycle of conveyor 5. An item I is receivable by flight conveyor 5 only during a portion of each cycle thereof (i.e., only during a portion of the cycle of a machine when the placement of the item would not interfere with the flights of the flight conveyor). As described herein, the continuously operable flight conveyor 5 feeds items I into an overwrap machine O in timed relation to the latter. As previously mentioned, items I are randomly received at an average rate, referred to as a second rate $r_2$. In accordance with this invention this second rate $r_2$ is somewhat slower than the first rate $r_1$ for purposes which will appear.

Figure 2:
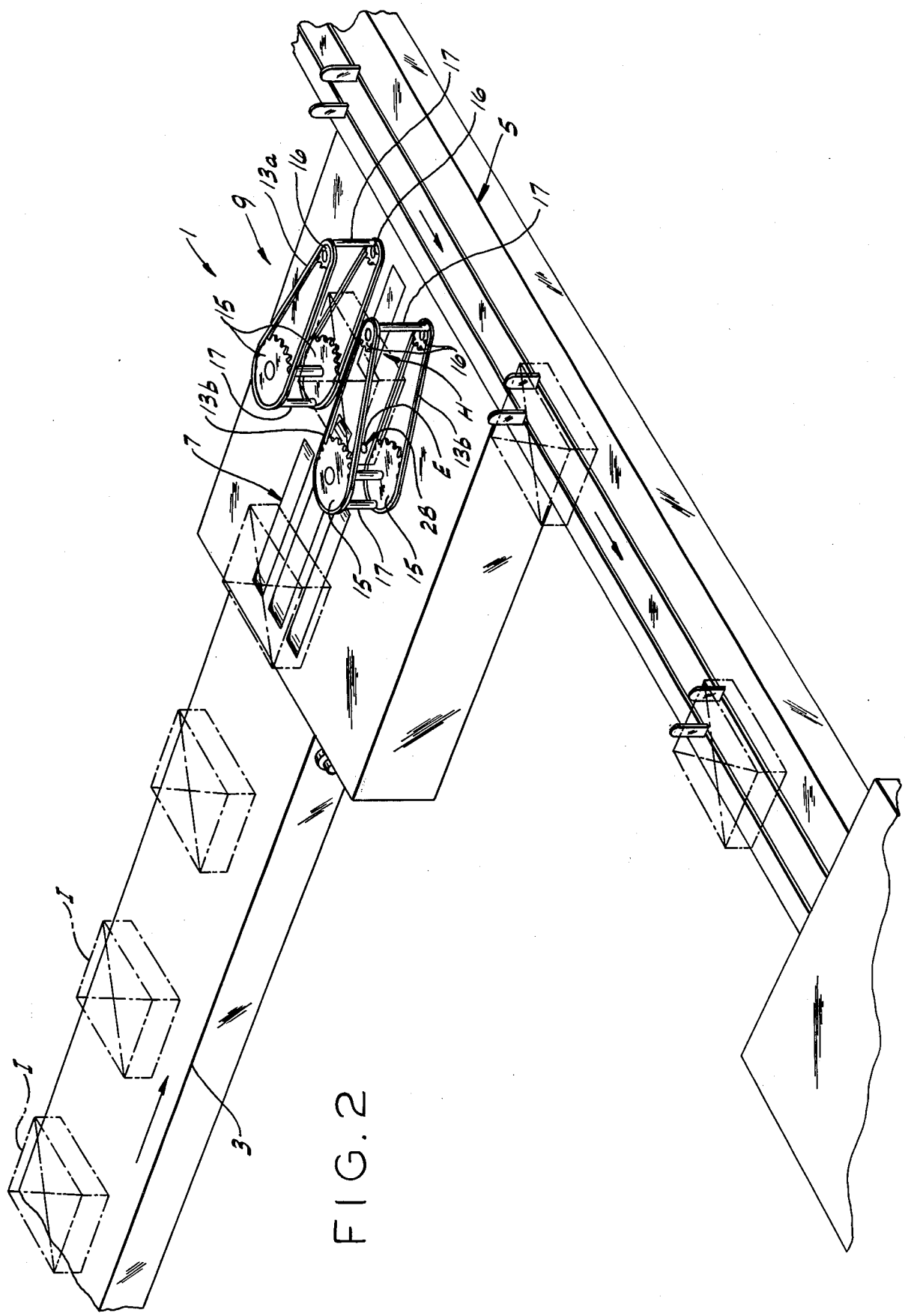
FIG. 2 is a diagramatic perspective view of the apparatus shown in FIG. 1.

Apparatus 1 is shown to further comprise a first or pacing conveyor 7 which is adapted to randomly receive items I one at a time from infeed conveyor 3 and a second or placing conveyor 9 adapted to receive items from the pacing conveyor at a holding station H and to convey each item delivered to the holding station for delivery to flight conveyor 5 during the above-mentioned portion of the cycle of the flight conveyor in timed relation to the operation of the flight conveyor. In this manner, pacing conveyor 7 delivers an item I to the holding station H and placing conveyor 9 conveys it onto flight conveyor 5 without interference from the flights 6 of the flight conveyor. Thus, one item I is placed in an interval between sets of flights 6 and the flights engage the item to positively convey it forward toward the overwrap machine in timed relation to the operating rate of overwrap machine O. The first or pacing conveyor 7 is shown to be a belt conveyor which may be selectively driven either at fast or slow speed in a manner as will appear. The second or placing conveyor 9 is shown to comprise sets of endless chains 13a, 13b on opposite sides of the item at the holding station and extending forward therefrom toward flight conveyor 5. Each set of chains 13a, 13b includes an upper and lower chain trained around sprockets 15 and 16 and includes at least one vertical flight 17 extending between the pair of chains of each set. In FIGS. 1 and 2, two flights 17 are shown with these flights being equally spaced around the chains. These flights are engageable with the trailing or rear end of an item I at holding station H for conveying the item forward upon operation of placing conveyor 9. The placing conveyor is operable through a cycle in which one pair of flights 17 moves from an initial position (the position of the leftmost flights as shown in FIG. 2) behind the item at the holding station H for engagement with the item at the holding station and then to a terminal position (the position of the rightmost flights as shown in FIG. 2) for placing the item at the holding station onto flight conveyor 5. It will be understood that upon completion of a cycle of placing conveyor 9 that a next set of flights 17 will have moved into their initial positions.

In normal operating conditions, flight conveyor 5 is continuously driven at a rate $r_1$ only slightly faster than the average rate $r_2$ at which infeed conveyor 3 delivers items I to apparatus 1. For example, the flight conveyor may be operated at rate $r_1$ to convey approximately 62 items per minute and conveyor 3 may be operated at second rate $r_2$ so as to deliver approximately 60 items per minute to apparatus 1. By periodically deferring or skipping placement of an item I at holding station H between sets of flights 6 of flight conveyor 5, each item I delivered to apparatus 1 may be paced relative to the flights 6 and placed on the flight conveyor so as to not interfere with the flights.

More specifically, flight conveyor 5 and apparatus 1 are driven via a common drive shaft 18 which may, for example, be driven by packaging apparatus O. Thus, flight conveyor 5 is driven in time with the packaging machine and feeds an item I to the packaging machine on each cycle of the packaging machine. Conveyors 7 and 9 are driven at a predetermined speed ratio relative to the speed of flight conveyor 5 by a chain and sprocket drive, as indicated at 19 (see FIG. 1). Drive 19 includes a mechanical overrun clutch 20, such as a model PSI #6 commercially available from Precision Specialties, Inc. for driving conveyor 7, and electric brake clutch coupling 21, such as a model PB500 or SF500 commercially available from the Warner Electric Brake and Clutch Company of Beloit, Wisconsin. Conveyor 7 is driven by clutch 20 at low speed, but it may be selectively driven at a higher speed via electric clutch 21 in a manner as will appear. Placing conveyor 9 is operated through one cycle by means of a single revolution, air actuated clutch 23, such as is commercially available from the Hilliard Corporation of Elmira, New York under their commercial designation Type 6 - Size D4. This single revolution clutch is operated by means of an air cylinder (not shown) which is selectively operated (pressurized) by a solenoid air valve AV (see FIG. 3). Upon actuation of the single revolution clutch, placing conveyor 9 is driven through one cycle of its operation thereby to convey an item I from holding station H and to place it on flight conveyor 5.

Apparatus 1 further comprises means for selectively changing the first or pacing conveyor 7 between its fast and slow speeds. Other means responsive to an item I being conveyed from holding station H is provided for actuation of the first conveyor speed change means thereby to accelerate the delivery of the next item I to the holding station and upon delivery of the next item I to the holding station for actuating the speed change means thereby slow down the first conveyor. Still other means is provided for sensing the portion of a cycle (referred to as a window W) of the flight conveyor 5 and initiating operation of the second or placing conveyor 9 by energizing air valve AV thereby to actuate the single revolution clutch 23 and for initiating operation of placing conveyor 9 so as to feed forward an item at the holding station to place it on flight conveyor 5 within the window W of a cycle of the flight conveyor, and for deferring operation of the placing or second conveyor 9 until a successive cycle of flight conveyor 5 when the next item is not in the holding station prior to the placing conveyor completing a cycle of its operation.

As shown in FIG. 1, a rotary timing shaft 29 in overwrap machine O is directly driven in a 1:1 ratio relative to the speed of the overwrap machine and flight conveyor 5 by the drive of overwrap machine. Timing cams C1 and C2 are carried by this timing shaft for actuating respective limit switches LS1 and LS2 at predetermined times during each cycle of the overwrap machine and of flight conveyor 5 for purposes as will appear. An electric eye E is provided adjacent the entrance end of placing conveyor 9 for sensing when item I is delivered from the pacing conveyor into holding station H. Cams C3 and C4 are rotated with the output shaft of single revolution clutch 23, these cams operating respective limit switches LS3 and LS4.

Figure 3:
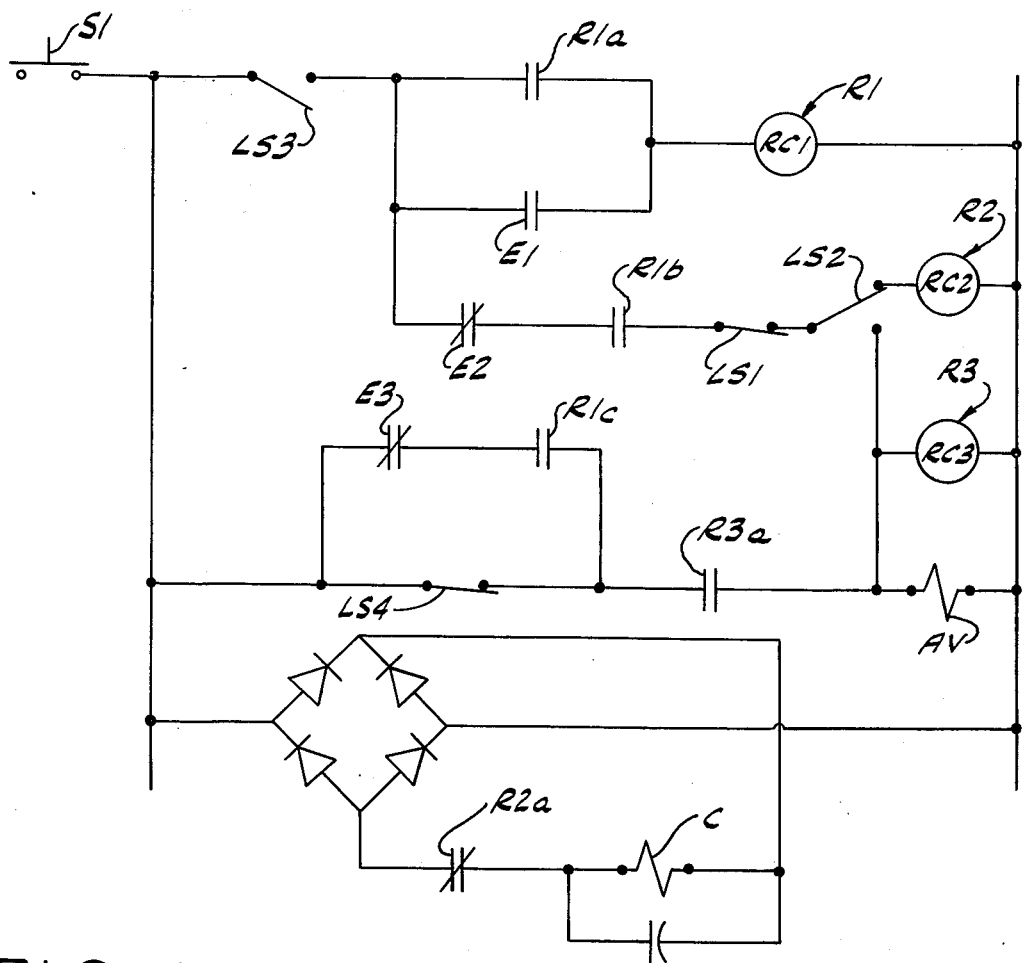
FIG. 3 is an electrical schematic of the control for apparatus of this invention.

In FIG. 3, an electrical schematic of the control system of the apparatus of this invention including the above-mentioned control means is shown. Power is supplied via an on-off switch S1. The control system includes limit switches LS1 and LS2 actuated by their respective cams C1 and C2 on timing shaft 29 and limit switches LS3 and LS4 operated by cams C3 and C4 driven by the shaft of single revolution clutch 23 when the latter is actuated. Limit switch LS4 is opened as placing conveyor 9 completes one of its cycles for purposes as will appear. Electric eye E is shown to include a normally open contact E1 and normally closed contacts E2 and E3, these contacts being in their normal positions when the eye is not blocked by an item I moving toward holding station H. Relays R1, R2 and R3 are provided having respective relay coils RC1, RC2 and RC3 and contacts R1a, R1b, R1c, R2a and R3a. Air valve AV and coil C of electric clutch 21 are also shown in FIG. 3.

Figure 4:
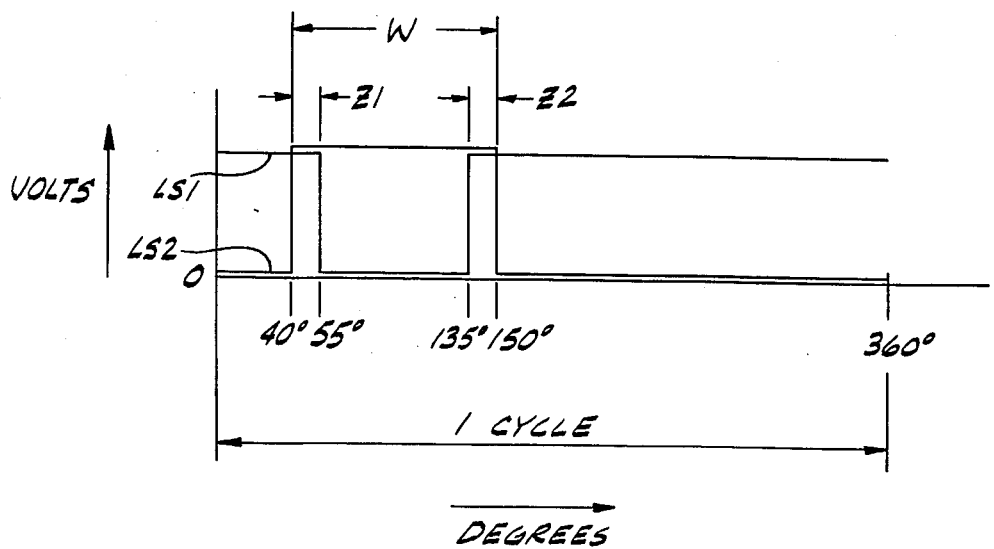
FIG. 4 is a graphical representation of the operation of certain switches of the apparatus of this invention illustrating the time relation between various controlled switches.

Operation of the pacing apparatus 1 of this invention is as follows: With flight conveyor 5 in operation and with placing conveyor 9 stopped so that one set of its flights 17 are in their initial position, limit switch LS3 is closed and limit switches LS1, LS2 and LS4, relays R1, R2, and R3 and their respective contacts, and eye contacts E1, E2 and E3 are in their positions as shown in FIG. 3. As heretofore mentioned, pacing conveyor 7 is driven at slow speed by its mechanical overrun clutch 20 and is shifted to its faster speed upon energization of its electric clutch 21. With the control system in the configuration described above, contact R1b is open and relay coil RC2 is deenergized. Thus, the normally closed contact R2a is closed and clutch coil C is energized so that pacing conveyor 7 is driven at high speed by electric clutch 21. Since placing conveyor 9 is stopped, switch LS3 is closed. Pacing conveyor 7 thus conveys an item I at high speed toward holding station H. Upon the leading edge of the item blocking eye E, its normally open contact E1 closes and its normally closed contacts E2 and E3 open. Thus coil RC1 of relay R1 is energized via switch LS3 and contact E1 and the normally open contacts R1a, R1b and R1c of relay R1 are closed. Closure of contact R1a latches coil RC1. Upon item I moving into holding station H eye E is unblocked as the trailing edge of the item moves therepast and its contacts are returned to their normal positions as shown in FIG. 3. Since relay R1 is now latched, power is supplied to switch LS1 via the contacts E2 and R1b and to contacts R3a via contact E3 and R1c. Coil R2C is thus energized and its normally closed contact R2a is opened thus de-energizing clutch coil C. Accordingly, pacing conveyor 7 is driven at slow speed via overrun clutch 2C. Item I is thus in position to be conveyed forward from the holding station at the proper time for placement on flight conveyor 5 within a window W of one of the cycles of the flight conveyor. As the next set of flights 6 of flight conveyor 5 moves into position relative to placing conveyor 9, cams C1 and C2 on timimg cam shaft 29 actuate their respective switches LS1 and LS2 in timed relation to movement of the flights of conveyor 5. As shown in FIG. 4, switch LS1 is normally closed and switch LS2 is normally in a first or open position (as shown) in which coil R2C is energized. Cam C2 moves switch LS2 to a second or closed position (not shown) thus establishing the leading edge of window W prior to the time cam C1 opens switch LS1. For a short time, referred to as zone Z1, switches LS1 and LS2 are both closed thus de-energizing coil RC2 and energizing coil RC3 of relay R3 and air valve AV. contact R3a is thus closed. Upon energization of air valve AV single revolution clutch 23 is engaged and placing conveyor 9 is driven so as to feed the item at the holding station H forward for placement on conveyor 5 between the flights 6 thereof in timed relation thereto. Upon de-energization of coil RC2 (i.e., upon switches LS1 and LS2 both being closed in zone Z1), contact R2a returns to its normally closed position thus energizing coil C of electric clutch 21 thereby to drive pacing conveyor 7 at its fast speed. Cam C3 opens switch LS3 thus dropping out relay R1 and resetting its contacts to their normal positions as shown in FIG. 3. After initiation of movement of conveyor 9 and after de-energization of relay R1, switch LS3 is closed. Prior to placing conveyor 9 completing its cycle of operation, pacing conveyor 7 (which is now being driven at high speed via electric clutch 21) conveys the next item I toward holding station H and this next item blocks and unblocks eye E thus remaking relay R1 via switch LS3 and E1. If the next item I is conveyed into its proper position at holding station H prior to switch LS4 being opened by cam C4, (i.e., before a cycle of the placing conveyor is completed), air valve AV will remain energized via eye contacts E3, R1c and R3a. Thus, so long as items I are delivered to the holding station by pacing conveyor 7 before switch LS4 is opened, the placing conveyor will continue to operate without stopping.

Because there is a slight difference between rate $r_1$ at which conveyor 5 operates (e.g., 62 flights per minute)

and the average rate $r_2$ at which items I are delivered to apparatus 1 (e.g., 60 items per minute), flights 17 of placing conveyor 9 and the placement of items I in holding station H will gradually move out of phase with one another. Assuming upon starting operation of apparatus 1, that items I being delivered to holding station H are delivered at the front of window W, each successive item will arrive at the holding station somewhat later in the cycle of conveyor 5 than the preceding item. After so many items have been placed, one item wil not be positioned at the holding station before switch LS4 opens. Thus, switch LS4 will deenergize air valve AV and disengage single revolution clutch 23 so as to stop operation of conveyor 9. If the next item I, however, is moved into position at holding station H before switches LS1 and LS2 are again both closed at the trailing edge of window W of the next successive cycle of conveyor 5, as indicated by zone Z2 in FIG. 4, air valve AV and relay R3 will be energized. In the manner as heretofor explained, air valve AV will remain energized via switch contacts E3, R1c and R3a so long as the successive items are conveyed to the holding station prior to switch LS4 opening. Thus, the placement of items I on flight conveyor 5 is controlled either by the front or rear active bands (zones Z1 and Z2) of window W. Clutch 23 remains engaged while placing several successive items and it need not be engaged and disengaged for each item placed. In the above-mentioned example where the average rates $r_1$ and $r_2$ of conveyor 5 and apparatus 1 were respectively 62 and 60 cycles per minute, about 15 items would be continuously placed in successive flights of conveyor 5 while being controlled by zone Z1 of the window. Upon one of the items not being in the holding station when switch LS4 opens, conveyor 9 may momentarily stop or hesitate until air valve AV is again triggered by the rear edge of window W (e.g., by zone Z2) and the next 15 or so items will be continuously placed. It will be understood that about 30 items I will be placed in successive cycles of flight conveyor 5 without skipping a cycle even though there may be a slight hesitation as control of the placement of the items is shifted from zone Z1 to zone Z2. When a next item (i. e., the 30th item) is not delivered to the holding station H before opening of switch LS4 or in other words before the end of an operating cycle (e.g., the 29th cycle) of the placing conveyor, switch LS4 will stop operation of the second conveyor and the feeding forward of an item I will be deferred so that no item is placed in the next cycle (e.g., the 31st cycle) of flight conveyor 5. If the next item (e.g., the 30th item) is in holding station H prior to the occurrence of zone Z1 of the next operation cycle (e.g., the 31st cycle) of conveyor 5, the abovedescribed sequence will be again initiated. Thus, in the placement of 60 items I, two cycles of conveyor 5 (e.g., the 30th and 60th cycles) would be skipped so as to keep the rate at which times I are delivered and the rate which flight conveyor 5 is operated in phase with one another thereby to prevent flights 6 from interfering with the placement of an item I.

It will be understood that in the event an item I blocks, but does not unblock eye E, conveyor 9 cannot be restarted until the blocking item has been removed.

As heretofore mentioned, as an item I at holding station H is fed forward by placing conveyor 9 upon the closing of switch LS2, relay R2 is de-energized and clutch coil C is energized via the normally closed contact R2a. Thus, pacing conveyor 7 is driven at high speed via electric clutch 21 thereby to deliver the next item to holding station H as quickly as possible. Pacing conveyor 7 will continue to be driven at high speed after switch LS4 opens and thereby terminates operation of conveyor 9 until such time as the next item has been delivered to the holding station blocking and unblocking eye E thus again energizing relay R2 and opening contacts R2a. The length of time conveyor 7 is run at slow speed is equal to the time between eye E being unblocked by the item moving into the holding station and the time at which switch LS2 opens at the front edge of zone Z1. The period during which conveyor 7 is operated at slow speed and the length of time the next item may be retarded while being conveyed toward holding station H is variable. The maximum retardation or pacing thus is from the trailing end of zone Z2 when switch LS2 moves to its first position (as shown in FIG. 3) and the front edge of zone Z1 of the next successive cycle. The minimum amount of retardation or pacing is zero as occurs when placing conveyor 9 is stopped between zones Z1 and Z2, or stopped and waiting for item I to be delivered to the holding station H unblocking eye E.

Now that the apparatus of this invention has been discussed in detail, the method of this invention of placing randomly received items on apparatus such as on flight conveyor 5 will be discussed. While the method of this invention will be discussed. While the method of this invention will be disclosed in the context of apparatus 1, it will be understood that apparatus 1 is not essential in carrying out the method of this invention. As heretofore mentioned, items I are received by pacing conveyor 7 from a continuously driven infeed belt conveyor 3 at an average rate heretofore referred to as the second rate $r_2$. These items are not necessarily equally spaced on conveyor 3. The intervals between the items are preferably about the same, but there may be variations in spacing between adjacent items. For example, conveyor 3 may be operated so as to feed on the average, about 60 items per minute onto pacing conveyor 7 with the items being spaced from one another by several inches with the spacing between successive items varying an inch or two from the average spacing. Flight conveyor 5 is operated at a uniform and steady rate, referred to as the first rate $r_1$, with flights 6 defining cycles of operation for flight conveyor 5. It will be understood that the drive for flight conveyor 5 may be an eccentric drive so that the flights are accelerated and decelerated during each cycle thereof, but the flight conveyor will still have an average continuous operational rate. In accordance with this invention the rate $r_1$ is greater than rate $r_2$ and flight conveyor 5 periodically moves in and out of phase with respect to delivery of items I onto apparatus 1. The method of this invention accommodates variancies in the time an item is delivered to the holding station and paces the delivery of items onto flight conveyor 5 so that they are placed in window W between successive flights 6 of the flight conveyor without interferences with flights 6. The result is that the placement of an item in a cycle of flight conveyor 5 is deferred or skipped when that item would interfere with the flight 6. Thus, the different rates $r_1$ and $r_2$ may be brought back into phase with one another. Also according to the method of this invention, several successive items may be placed on flight conveyor 5 without intermittently starting and stopping placing conveyor 9. It will be understood that in accordance with this method, however, placing conveyor 9 may be stopped and started to place each and every item I if necessary or desired.

The difference between rates $r_1$ and $r_2$ may be expressed in an equation form as follows:

$r_1 = K \cdot r_2$ where $k$ is a constant.

The difference between rates $r_1$ and $r_2$ may vary considerably, for example, rate $r_1$ may be twice as fast as rate $r_2$. Preferably, however, $r_1$ is only slightly faster than rate $r_2$. Thus, the constant $k$ may be greater than or equal to 1 or less than or equal to 2, and even more preferably is less than or equal to 1.1. In the above-mentioned example of the rates $r_1$ and $r_2$, rate $r_1$ is 62 cycles per minute and rate $r_2$ is 60 cycles per minute, with $k$ having a value approximately equal to 1.03.

Further in accordance with the method of this invention, approximately $[r_2/r_1 - r_2]$ items I may be placed in successive cycles of flight conveyor 5, one item being placed in each cycle, without deferring placement of an item in a cycle.

The method further includes sensing when a next item to be placed will be placed on the flight conveyor on the outside window W and then deferring the feeding forward of the next item for a time sufficient to skip the placement of the next item in at least one cycle of conveyor 5 thereby to substantially bring the first and second rates into phase with one another.

More specifically, the method of this invention comprises feeding the randomly received items I one at a time to a holding station H where an item may dwell for an interval. In apparatus 1, this step of the method is accomplished by pacing conveyor 7. The method further comprises feeding forward each item I which has been delivered to the holding station in time for delivery to the flight conveyor during the window of a cycle of a flight conveyor to the flight conveyor in timed relation to the flight conveyor for the delivery of the item thereto during the window of its operation cycle. The feeding of a randomly received item I to the holding station occurs at a relatively slow speed while the previous item is at the holding station and at an accelerated speed when the previous item is fed forward to flight conveyor 5. In apparatus 1, this step of the method is carried out by pacing conveyor being actuated to change from its slow to its fast speed. The method further includes deferring the feeding forward of an item which has been delivered to the holding station too late for delivery to the flight conveyor during the window portion of a cycle of the flight conveyor until the next successive cycle of the flight conveyor. This is accomplished by deactuating of single revolution clutch 23 of apparatus 1 and by deferring operation of placing conveyor 9 for a time sufficient to skip placement of an item in at least one cycle of the flight conveyor.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. The method of feeding items one after another to an apparatus which cycles continuously at a steady rate, referred to as the first rate, with an item being receivable by the apparatus only during a portion of each cycle, items to be fed to the apparatus being randomly delivered one at a time at an average rate, referred to as the second rate, said method comprising the steps of:

feeding the randomly received items one at a time to a holding station where an item may dwell for an interval;

feeding each item which has been delivered to the holding station in time for delivery to said apparatus during said portion of said cycle forward to said apparatus in timed relation with said apparatus for delivery of the item thereto during said portion;

the feeding of a randomly received item to the holding station occurring at a relatively slow speed while the next leading item is at the holding station, and at an accelerated speed when the next leading item is fed forward to said apparatus; and deferring the feeding forward of an item which has been delivered to the holding station too late for delivery to said apparatus during said portion of a cycle until a next successive cycle.

2. The method of claim 1 wherein said first rate is denoted by $r_1$ and the second rate is denoted by $r_2$, wherein $r_1$ is greater than $r_2$, and wherein the method further comprises placing approximately $r_2/r_1 - r_2$ items in successive cycles of said apparatus, one item being placed in each cycle, without deferring placement of an item in a cycle, and sensing when a next item to be placed will be placed on said apparatus outside said portion of its cycle, and then deferring the feeding forward of said next item for a time sufficient to skip placement of an item in at least one cycle of said apparatus thereby to substantially bring said first and second rates into phase with one another.

3. The method of claim 2 wherein $r_1 = k \cdot r_2$, where $k$ is a constant greater than or equal to 1 and less than or equal to 2.

4. The method of claim 3 wherein $k$ preferably is greater than or equal to 1 and less than or equal to 1.1.

5. Conveying apparatus for feeding items one after another to means which cycles continuously at a steady rate, referred to as a first rate, with an item being receivable by said means only during a portion of each cycle thereof, said items to be fed to said means being randomly delivered to said conveying apparatus one at a time at an average rate, referred to as a second rate, said second rate being somewhat slower than said first rate, said conveying apparatus comprising a first conveyor adapted to receive said items one after the other at said second rate, said first coveyor delivering the items one at a time to a holding station, and having a slow speed and a fast speed, means for selectively changing said first conveyor between its fast and slow speeds, means responsive to an item being conveyed from said holding station for actuating said first conveyor speed change means thereby to accelerate the delivery of the next item to said holding station and upon delivery of said next item to the holding station for actuating said speed change means thereby to slow down said first conveyor, and a second conveyor for conveying each item delivered to said holding station in time for delivery to said means during said portion of a cycle of said means in timed relation to operation of said means, and means for sensing said portion of a cycle of said means and for initiating operation of said second conveyor so as to convey an item at said holding station and to place it on said means within said portion of said cycle of said means and for deferring operation of said second conveyor until a successive cycle of said means when the next item is not in said holding station prior to said second conveyor completing placement of the preceding item on said means.

6. Conveying apparatus as set forth in claim 5 wherein said second conveyor has means for positively engaging an item at said holding station and for conveying it forward for placement on said means.

7. Conveying apparatus as set forth in claim 6 wherein said second conveyor has a plurality of sets of item-engaging means equally spaced from one another along said second conveyor, the latter being operable in a cycle for conveying an item from said holding station and for placement of this item on said means, one set of said item-engaging means being movable from an initial position in which said item may be freely moved into said holding station to a terminal position during each cycle of said second conveyor, and another set of said item-engaging means moving into its initial position as said second conveyor completes an operating cycle.

8. Conveying apparatus as set forth in claim 5 wherein said sensing means includes means for sensing said portion of a cycle of said means relative to said second conveyor and means for sensing the presence of an item at said holding station.

9. Conveying means as set forth in claim 8 wherein said second conveyor is driven through one cycle by said means at a fixed speed relative thereto via a selectively actuable clutch, said sensing means maintaining said clutch engaged as long as a next item is delivered to said holding station before said second conveyor completes a cycle of its operation whereby said second conveyor is continuously driven until such time as an item is not in position at said holding station prior to completion of a cycle of said conveyor at which time said clutch is disengaged thereby to defer feeding forward of a next item until a successive cycle of said means.

10. Conveying apparatus as set forth in claim 9 wherein said sensing means includes photoelectric means responsive to movement of a next item into said holding station.

11. Conveying apparatus as set forth in claim 10 wherein said sensing means further includes a timing camshaft driven in timed relation to the cycling of said means and a pair of cam-operated switches actuated by said camshaft for establishing said portion of each cycle of said means.

12. Conveying apparatus as set forth in claim 5 wherein said first conveyor is an endless belt conveyor.

13. Conveying apparatus as set forth in claim 5 wherein said first conveyor is driven at slow speed via a mechanical overrun clutch, and wherein means for selectively changing said first conveyor between its fast and slow speeds comprises a clutch responsive to initiation of a cycle of said second conveyor for changing said first conveyor from its slow to its fast speed thereby to accelerate the delivery of a next item to said holding station upon the preceding item being conveyed therefrom.

* * * * *